United States Patent [19]
Plotnikoff

[11] 3,719,761
[45] March 6, 1973

[54] METHOD OF ENHANCING MEMORY AND LEARNING

[75] Inventor: Nicholas Peter Plotnikoff, Lake Bluff, Ill.

[73] Assignee: Abbott Laboratories, North Chicago, Ill.

[22] Filed: Jan. 27, 1972

[21] Appl. No.: 221,395

[52] U.S. Cl. ....................................424/274
[51] Int. Cl. .....................................A61k 27/00
[58] Field of Search ............................424/274

[56] References Cited
OTHER PUBLICATIONS

Cotzias, Journal of Amer. Med. Ass. 11-17-69, Vol. 210, pp. 1255-1262.

Nair et al. Biochemical and Biophysical Research Comm. Vol. 43, No. 6 (1971)

Primary Examiner—Stanley J. Friedman
Attorney—Robert L. Niblack

[57] ABSTRACT

Covers the use of L-prolyl L-leucyl glycine amide in enhancing learning rate and retention levels of warm-blooded animals such as humans.

4 Claims, No Drawings

METHOD OF ENHANCING MEMORY AND LEARNING

SUMMARY OF THE INVENTION

This invention relates to the use of L-prolyl L-leucyl glycine amide in enhancing learning rate and memory level in normal animals and also those who may suffer an impairment in this area. Upon administration of said amide one realizes an enhancement of acquisition and retention of a learned response.

DETAILED DESCRIPTION OF THE INVENTION

L-prolyl L-leucyl glycine amide has recently been synthesized and the tripeptide structure is now known and is as follows:

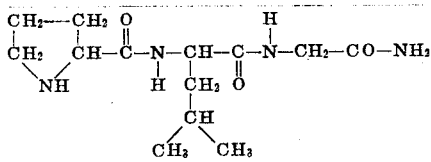

(See, for example, Celis et. al. Biophysical Soc. Abstract TPM-K, pp 98 a, 1971)

For convenience sake this amide will hereinafter be referred to as tripeptide.

It has been found here that this tripeptide when administered to animals results in the acquisition and retention of a conditioned avoidance response by the animals in a maze test. A markedly shortened escape time was found to result with respect to an acquisition test and retention trials in rats treated with the tripeptide. Pretreatment of the rats during the training trials resulted in markedly increased acquisition rates in comparison to control rats treated with saline solution. The treatment also resulted in prolonged retention of learned performance following drug administration.

A simple maze test was used to study the behavioral effects of the tripeptide on young rats (Long Evans strain 80-120 gms). Naive rats were trained in ten acquisition trials to discriminate between light and dark compartments in maze. The tripeptide was found to enhance the rate of acquisition in this test. With reference to the following example, a group of rats was randomly divided into control and treatment groups and the drug tested by oral administration to eight rats. The maze consisted of a rectangular chamber, 24 inches long, 10 inches wide and 12 inches high, half of which was divided into a dark and lighted side. Scrambled electric shock (100 volts) was delivered to the grid floor.

A single acquisition trial was started by placing the rat into the chamber on the undivided side. At the same time, a buzzer was sounded for 10 seconds followed by 5 seconds of footshock and buzzer. The correct response was for the animal to escape to the lighted, shock-insulated side of the maze. Ten trials were used, constantly alternating the lighted side of the maze every trial. The intertrial interval was approximately 10 minutes.

The behavioral effects resulting from administration of the tripeptide to rats were evaluated employing the previously described apparatus. The time from entrance into the chamber until the rat jumped out was recorded as the "escape time". With respect to the acquisition trial the criterion of successful learning was an escape time less than the control.

The following example illustrates the efficacy of the invention by demonstrating the effectiveness of the tripeptide here in ehnancing learning and short-term memory.

EXAMPLE I

The tripeptide was administered by the oral route at a dose of 1.0 mg./kg. one hour prior to the initiation of 10 acquisition trials in the above described rat maze test. Results in the 10 trials compared to a control (no drug) are presented below in Table I.

TABLE I

Escape Time (seconds ± standard deviation)

| Acquisition Trial No. | Controls | 1.0 mg./kg. Tripeptide |
|---|---|---|
| 1 | 14.1 ± 0.4 | 14.1 ± 0.4 |
| 2 | 11.5 ± 1.4 | 11.3 ± 1.3 |
| 3 | 9.6 ± 1.4 | 5.3 ± 1.8 |
| 4 | 11.1 ± 1.1 | 8.7 ± 1.7 |
| 5 | 7.1 ± 1.7 | 2.5 ± 0.5 |
| 6 | 8.3 ± 1.6 | 5.3 ± 1.4 |
| 7 | 5.6 ± 1.5 | 1.2 ± 0.1 |
| 8 | 7.1 ± 1.9 | 4.3 ± 1.1 |
| 9 | 6.2 ± 1.9 | 1.7 ± 0.3 |
| 10 | 7.1 ± 2.0 | 1.3 ± 0.2 |
| Overall Mean | 8.7 ± 0.7 | 5.6 ± 0.4 |

From the foregoing studies, it is apparent that the tripeptide effectively enhances the learning rate level in animals. In addition, the drug acts to increase memory level.

The compositions here may be administered by dispersing them in a liquid carrier or by providing the active composition in the form of granulation tablets, capsules, elixirs, emulsions, and other dosage forms well known in the art. The administration may include oral administration or any other means of administering such as intraperitoneal, or intramuscular; or, if desired, the active ingredients can be incorporated in an oil or wax base and administered as suppository.

The compounds of this invention have been found to be effective within the dosage range of from about 0.01 to about 100 mg./kg. of body weight daily, depending upon the animal treated. More preferably, the dosage range is 0.1-4 mg./kg. In any event, it is desirable that the tripdptide be administered at a dosage level sufficiently effective to enhance acquisition rate and retention level.

What is claimed is:

1. A method of enhancing acquisition rate and retention level impairment in a warm-blooded animal which comprises administering to a warm-blooded animal having some impairment in rate of learning and in level of retention at least an effective dosage of L-prolyl, L-leucyl glycine amide.

2. The method of claim 1 wherein said dosage range is from about 0.01 to about 100 mg./kg. of body weight daily.

3. A method of enhancing acquisition rate and retention level in warm-blooded animals which comprises administering to a warm-blooded animal at least an effective dosage of L-prolyl, L-leucyl glycine amide.

4. The method of claim 3 wherein said dosage range is from about 0.01 to about 100 mg./kg. of body weight daily.

* * * * *